United States Patent
Johansson et al.

(10) Patent No.: US 9,591,003 B2
(45) Date of Patent: Mar. 7, 2017

(54) DYNAMIC APPLICATION SECURITY VERIFICATION

(71) Applicant: Amazon Technologies, Inc., Reno, NV (US)

(72) Inventors: Jesper Mikael Johansson, Redmond, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 14/012,520

(22) Filed: Aug. 28, 2013

(65) Prior Publication Data

US 2015/0067830 A1   Mar. 5, 2015

(51) Int. Cl.
| | |
|---|---|
| *H04L 29/06* | (2006.01) |
| *H04W 12/12* | (2009.01) |
| *G06F 21/53* | (2013.01) |
| *G06F 21/55* | (2013.01) |
| *G06F 21/56* | (2013.01) |

(52) U.S. Cl.
CPC .......... *H04L 63/1408* (2013.01); *G06F 21/53* (2013.01); *G06F 21/554* (2013.01); *G06F 21/566* (2013.01); *H04L 63/14* (2013.01); *H04W 12/12* (2013.01)

(58) Field of Classification Search
USPC ... 713/154, 164, 168, 188; 726/1, 22, 23, 25
See application file for complete search history.

(56) References Cited

U.S. PATENT DOCUMENTS

| | | | | | |
|---|---|---|---|---|---|
| 5,673,315 | A | * | 9/1997 | Wolf ................... | G06F 9/44521 705/59 |
| 5,974,549 | A | * | 10/1999 | Golan ..................... | G06F 9/468 714/47.3 |
| 8,181,254 | B1 | * | 5/2012 | Kay ....................... | G06F 21/121 713/168 |
| 8,578,499 | B1 | * | 11/2013 | Zhu ....................... | G06F 21/567 713/154 |
| 2008/0016339 | A1 | * | 1/2008 | Shukla .................. | G06F 21/53 713/164 |
| 2009/0307477 | A1 | * | 12/2009 | Matthew ................ | G06F 8/60 713/2 |

(Continued)

OTHER PUBLICATIONS

International Search Report from corresponding PCT/US2014/052932 dated Dec. 18, 2013.

(Continued)

*Primary Examiner* — Joseph P Hirl
*Assistant Examiner* — Sayed Beheshti Shirazi
(74) *Attorney, Agent, or Firm* — Thomas | Horstemeyer, LLP (57) ABSTRACT

Disclosed are various embodiments for performing security verifications for dynamic applications. An instance of an application is executed. During runtime, it is determined whether the application is accessing dynamically loaded code from a network site. In one embodiment, the access may be detected via the use of a particular application programming interface (API). In another embodiment, the access may be detected via the loading of downloaded data into an executable portion of memory. A security evaluation is performed on the dynamically loaded code, and an action is initiated responsive to the security evaluation.

20 Claims, 5 Drawing Sheets

(56) References Cited

U.S. PATENT DOCUMENTS

| | | | |
|---|---|---|---|
| 2010/0107252 A1 | 4/2010 | Mertoguno | |
| 2010/0293080 A1* | 11/2010 | Shah | G06F 8/34 705/34 |
| 2010/0293591 A1* | 11/2010 | Shah | G06F 8/34 726/1 |
| 2011/0277033 A1* | 11/2011 | Ramchetty | G06F 21/566 726/24 |
| 2012/0117651 A1 | 5/2012 | Edery et al. | |
| 2012/0272320 A1* | 10/2012 | Rados | G06F 21/564 726/24 |
| 2012/0291022 A1 | 11/2012 | Mehta et al. | |
| 2013/0074046 A1* | 3/2013 | Sharma | G06F 11/3688 717/126 |
| 2013/0145463 A1* | 6/2013 | Ghosh | G06F 21/56 726/22 |
| 2013/0145472 A1* | 6/2013 | Ramabhatta | G06F 21/566 726/25 |
| 2013/0212684 A1* | 8/2013 | Li | G06F 17/30522 726/25 |
| 2013/0227636 A1* | 8/2013 | Bettini | H04W 4/001 726/1 |
| 2013/0303159 A1* | 11/2013 | Gathala | G06N 5/043 455/425 |
| 2013/0304676 A1* | 11/2013 | Gupta | G06N 99/005 706/12 |
| 2013/0304677 A1* | 11/2013 | Gupta | G06N 5/043 706/12 |
| 2014/0053261 A1* | 2/2014 | Gupta | G06F 21/55 726/22 |
| 2014/0115646 A1* | 4/2014 | Rajgopal | H04N 21/4622 725/110 |
| 2014/0215614 A1* | 7/2014 | Beskrovny | G06F 21/51 726/23 |
| 2015/0007315 A1* | 1/2015 | Rivera | G06F 21/51 726/23 |

OTHER PUBLICATIONS

U.S. Appl. No. 13/926,211 entitled "Analyzing Security of Applications", filed Jun. 25, 2013.

"Thwarting malware", Haute Secure: How it Works, http://web.archive.org/web/20080101105546/http://hautesecure.com/howitworks.aspx, Jul. 7, 2008-Mar. 17, 2009, retrieved Jul. 23, 2013.

* cited by examiner

DYNAMIC APPLICATION SECURITY VERIFICATION

BACKGROUND

Mobile applications are typically obtained through an application marketplace that features the offerings from a multitude of developers. Customers may utilize the application marketplace for a variety of reasons. For example, a customer's mobile device may be preconfigured to utilize a particular application marketplace, thereby making obtaining applications via the particular application marketplace the easiest option. In some cases, the customer's mobile device may be preconfigured such that applications may only be obtained via the particular application marketplace. Ultimately, customers may prefer to utilize an application marketplace due to a perception that applications obtained via the marketplace are relatively safer. In other words, customers may perceive that the proprietor of the application marketplace is trustworthy, and, therefore, the applications offered via the application marketplace are trustworthy.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to security verification for mobile applications. Customers may perceive that applications offered via an application marketplace are safe and that the proprietor of the application marketplace has vouched for the security of the offered applications. Thus, it is in the interest of the proprietor to perform security verifications upon the applications that are offered. However, security evaluation for some applications may be a challenging proposition. While some applications are monolithic, allowing their code to be evaluated in their entirety before customer use, other applications may be dynamic, with portions of code being downloaded after application is installed in the customer's device. In other words, the proprietor of the application marketplace never has the opportunity to evaluate the subsequently downloaded code for security risks.

As a non-limiting example, an application may be offered that appears to be a game involving salamanders in a blender. The application may seem to innocuously request various security permissions on the customer's device. However, once the application is executed on the customer's device, the application may download and execute malicious code in the background that gathers and transmits passwords, credit card numbers, and other private information unbeknownst to the customer. One naïve solution to this issue is to block any application having dynamic code from being offered by the application marketplace. While obviating the security risks, such a solution ignores the many benefits afforded to developers through the use of dynamic code. For example, the use of dynamic code may provide more flexibility and faster release times for developers. Otherwise, for every minor code tweak, the developer would be required to submit a new version of the application for consideration by the application marketplace.

Various embodiments of the present disclosure provide approaches to perform security verifications on dynamic applications. Code obtained by a dynamic application is identified. In one embodiment, applications are written using an application programming interface (API) that distinguishes obtained code from obtained data. In another embodiment, applications are sandboxed, and the execution environment of the sandbox tracks whether obtained data is stored in an executable code area of system memory or a data area of system memory. Once the obtained code is ascertained, the code may be evaluated for security risks or compared to code that has previously been evaluated. In some cases, the detected security issues may be automatically repaired, or the application may be disabled and/or removed from the application marketplace.

Figure 1:
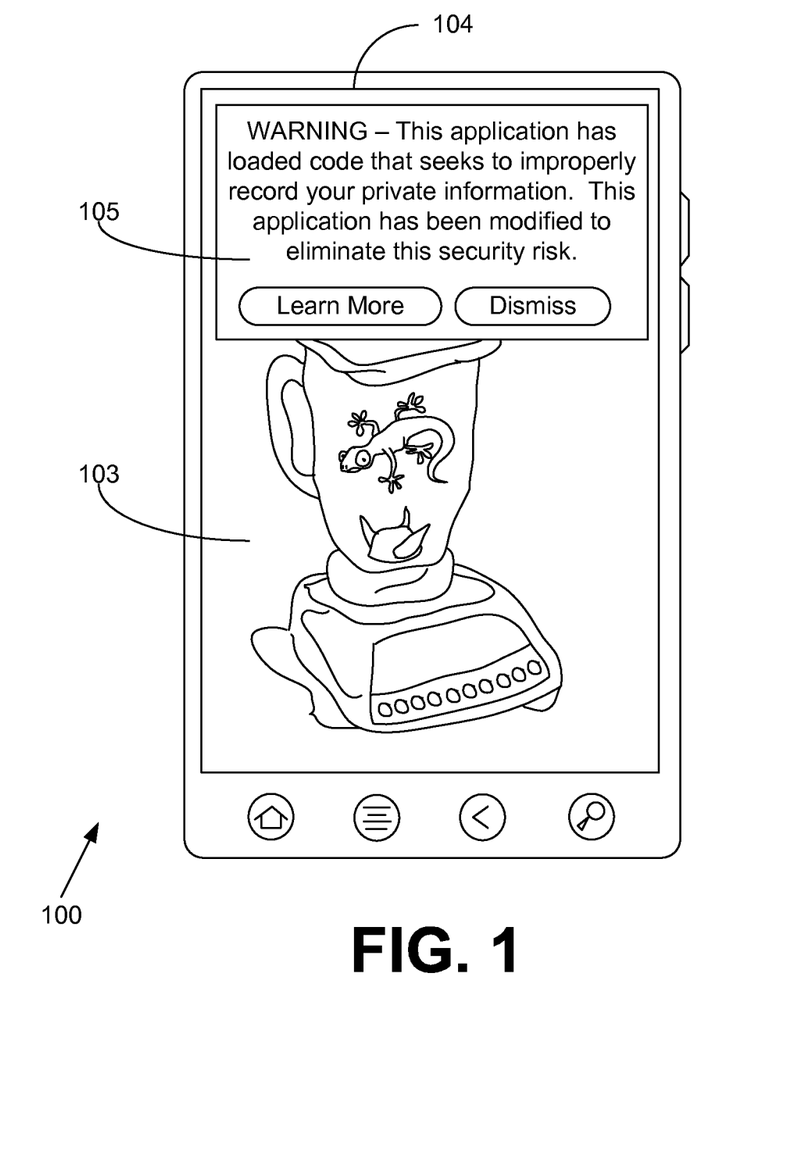
FIG. 1 is a drawing of one example of a client device rendering a user interface upon a display according to one embodiment of the present disclosure.

With reference to FIG. 1, shown is one example of a client device 100 rendering a user interface 103 upon a display 104 according to one embodiment. The user interface 103 is generated by the game application involving salamanders in a blender discussed in the aforementioned example. According to the principles of the present disclosure, a security verification service has detected that the game application has loaded executable code that seeks to improperly record private information from the client device 100. Consequently, the security verification service has modified the application to neutralize the security risk. A user interface component 105 rendered upon the user interface 103 informs users that the application has been modified to address the security risk. Subsequently, the user may be able to continue using the application after the malware portion has been neutralized. Although the user interface component 105 is shown in the example of FIG. 1, in other examples, the application may be modified, blocked, terminated, and so on, without a user notification being provided. In the following discussion, a general description of the system and its components is provided, followed by a discussion of the operation of the same.

Figure 2:
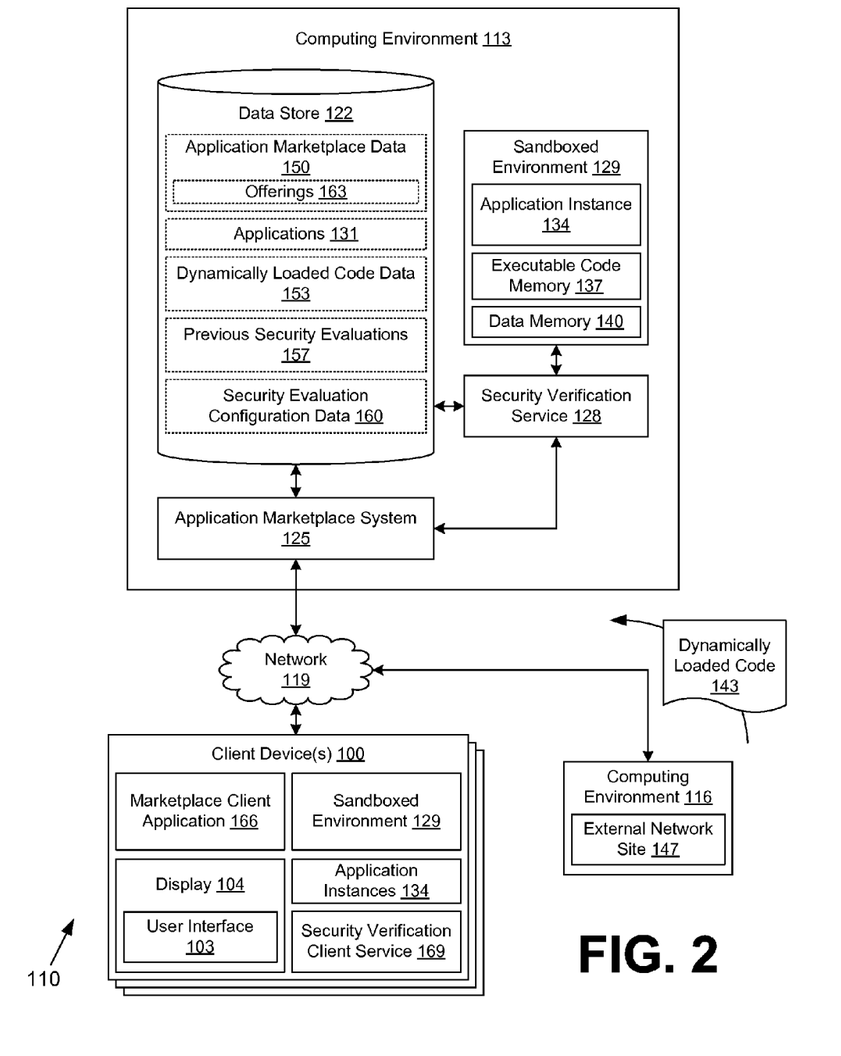
FIG. 2 is a drawing of a networked environment according to various embodiments of the present disclosure.

Turning now to FIG. 2, shown is a networked environment 110 according to various embodiments. The networked environment 110 includes a computing environment 113, a computing environment 116, and one or more client devices 100 in data communication via a network 119. The network 119 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 113 may comprise, for example, a server computer or any other system providing computing capability. Alternatively, the computing environment 113 may employ a plurality of computing devices that are arranged, for example, in one or more server banks or computer banks or other arrangements. Such computing devices may be located in a single installation or may be distributed among many different geographical locations. For example, the computing environment 113 may include a plurality of computing devices that together may comprise a hosted computing resource, a grid computing resource, and/or any other distributed computing arrangement. In some cases, the computing environment 113 may correspond to an elastic computing resource where the allotted capacity of processing, network, storage, or other computing-related resources may vary over time.

Various applications and/or other functionality may be executed in the computing environment 113 according to various embodiments. Also, various data is stored in a data store 122 that is accessible to the computing environment 113. The data store 122 may be representative of a plurality of data stores 122 as can be appreciated. The data stored in the data store 122, for example, is associated with the operation of the various applications and/or functional entities described below.

The components executed on the computing environment 113, for example, include an application marketplace system 125, a security verification service 128, a sandboxed environment 129, and other applications, services, processes, systems, engines, or functionality not discussed in detail herein. The application marketplace system 125 is executed to facilitate distribution of applications 131 from a plurality of developers. In one embodiment, the application marketplace system 125 is managed by a single entity, referred to herein as the proprietor. The application marketplace system 125 may employ a security verification service 128 to perform security evaluations upon the applications 131. When the security verification service 128 confirms that an application 131 includes no security risks, the application 131 may be offered by the application marketplace system 125.

The security verification service 128 may be executed to perform these evaluations. To this end, the security verification service 128 may employ various tools to determine whether an application 131 contains a security risk. For example, the security verification service 128 may detect whether the application 131 communicates with known malicious servers, the security verification service 128 may detect signatures of known malicious code in the application 131, or the security verification service 128 may detect known behavior, or patterns of behavior, from the application 131 that is malicious. In some embodiments, the security verification service 128 may employ third-party tools that perform other types of content or code inspection. In some embodiments, the security verification service 128 may be configured to repair or otherwise modify the application 131 to eliminate or otherwise neutralize detected security risks.

Where an application 131 is monolithic, or self-contained, the security evaluations may be relatively straightforward. Various examples of security evaluations are disclosed in U.S. patent application Ser. No. 13/926,211, filed on Jun. 25, 2013, and entitled "ANALYZING SECURITY OF APPLI-CATIONS," which is incorporated herein by reference in its entirety. However, where an application 131 is a dynamic application that loads code obtained from an external site, the security evaluations may be more challenging as the code of the application 131 may change after the application 131 is downloaded to a client device 100.

In one embodiment, the security verification service 128, as a part of an application ingestion process, may execute an application instance 134 within a sandboxed environment 129. The sandboxed environment 129, in this situation, may correspond to a virtualized environment that emulates a client device 100. Alternatively, the sandboxed environment 129 may correspond to an execution environment that monitors code execution and restricts application access to data and/or system services. The sandboxed environment 129 may include executable code memory 137 and data memory 140. As the application instance 134 executes within the sandboxed environment 129, the security verification service 128 may detect dynamically loaded code 143 that is obtained by the application instance 134 from an external network site 147. Accordingly, the security verification service 128 may perform a security evaluation on the dynamically loaded code 143. Although the security verification service 128 that is resident in the computing environment 113 has been described, it is understood that portions of the security verification service 128 may be executed in the client devices 100 as well. Additionally, at least a portion of the security verification service 128 may instead be implemented in network devices within the network 119, e.g., firewalls, load balancers, routers, and so on.

The data stored in the data store 122 includes, for example, application marketplace data 150, applications 131, dynamically loaded code data 153, previous security evaluations 157, security evaluation configuration data 160, and potentially other data. The application marketplace data 150 includes data supporting the functionality of the application marketplace system 125, including a plurality of offerings 163 of applications 131. Each of the offerings 163 may be associated with titles, descriptions, prices, device compatibility information, screenshots, customer reviews, customer ratings, download statistics, device privileges requested by the application 131, and/or other information. The offerings 163 may also be associated with an indication of a security verification level for the application 131. Applications 131 that could not be fully verified via a security evaluation may be associated with a relatively lower security verification level as compared to applications 131 that are fully evaluated.

The applications 131 correspond to the packages or code implementing an application 131 offered via the application marketplace system 125. The applications 131 may be mobile applications, e.g., for smartphones, tablets, electronic book readers, etc., or desktop applications, e.g., for desktop computers, laptop computers, etc., as the case may be. The applications 131 may be associated with signatures, fingerprints, checksums, version information, and/or other information that can be used to verify the source, integrity, and/or version of the application 131. The applications 131 may correspond to native or monolithic applications, application marketplace-supplied containers for dynamic applications, customer-supplied containers for dynamic applications, and/or other types of applications.

The dynamically loaded code data 153 may include versions or packages of dynamically loaded code 143 that have been processed by the security verification service 128. In some embodiments, the dynamically loaded code data 153 may include signatures, fingerprints, checksums, version information, and/or other information that can be used to verify the source, integrity, and/or version of the dynamically loaded code 143. The previous security evaluations 157 correspond to the results of previous security evaluations performed by the security verification service 128 on various versions of dynamically loaded code 143. The security evaluation configuration data 160 may include data that configures detection of malicious code, repair of malicious code, and/or other actions performed or initiated by the security verification service 128.

The computing environment 116 may comprise, for example, a server computer or any other system providing computing capability. Alternatively, the computing environment 116 may employ a plurality of computing devices that are arranged, for example, in one or more server banks or computer banks or other arrangements. Such computing devices may be located in a single installation or may be distributed among many different geographical locations. For example, the computing environment 116 may include a plurality of computing devices that together may comprise a hosted computing resource, a grid computing resource, and/or any other distributed computing arrangement. In some cases, the computing environment 116 may correspond to an elastic computing resource where the allotted capacity of processing, network, storage, or other computing-related resources may vary over time.

Various applications and/or other functionality may be executed in the computing environment 116 according to various embodiments. Also, various data may be stored in a data store that is accessible to the computing environment 116. The components executed on the computing environment 116, for example, include an external network site 147 and other applications, services, processes, systems, engines, or functionality not discussed in detail herein. The external network site 147 is operated by an entity different from the proprietor of the application marketplace system 125 and is configured to serve dynamically loaded code 143 to instances of applications 131 that are executing in the client devices 100 and/or the computing environment 113. The external network site 147 may be operated by the developer of the application 131 or a third party. In some cases, the external network site 147 may be operated by, or compromised by, malicious users who seek to deploy malware via the dynamically loaded code 143.

The client device 100 is representative of a plurality of client devices 100 that may be coupled to the network 119. The client device 100 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 100 may include a display 104. The display 104 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The client device 100 may be configured to execute various applications such as a marketplace client application 166, a sandboxed environment 129, application instances 134, a security verification client service 169, and/or other applications. The marketplace client application 166 may be executed in a client device 100, for example, to access network content served up by the computing environments 113, 116, and/or other servers, thereby rendering a user interface 103 on the display 104. Specifically, the marketplace client application 166 is employed for a user at the client device 100 to interact with the application marketplace system 125. The marketplace client application 166 may facilitate searching for applications 131, purchasing applications 131, downloading applications 131, installing applications 131, and/or other actions relative to the application marketplace system 125 and to the client device 100. In some cases, the marketplace client application 166 may, for example, correspond to a browser, a mobile application, etc., and the user interface 103 may correspond to a network page, a mobile application screen, etc.

In various embodiments, application instances 134 may execute separately in the client device 100 or within a sandboxed environment 129. The sandboxed environment 129 is employed to monitor dynamically loaded code 143 that is downloaded and loaded into memory by the application instances 134. As with the sandboxed environment 129 of the computing environment 113, the sandboxed environment 129 of the client device 100 may include executable code memory 137 and data memory 140. The sandboxed environment 129 of the client device 100 may or may not incorporate emulation and/or virtualization; if not, the sandboxed environment 129 may merely be a layer that may prevent the application instances 134 from accessing resources of the client device 100 directly.

The security verification client service 169 corresponds to client-executed portions of the security verification service 128. Since the dynamically loaded code 143 for the application instances 134 may change at runtime, it may be beneficial to perform at least a portion of the security evaluation of the dynamically loaded code 143 in the client device 100. For example, the security verification client service 169 may verify the version of the dynamically loaded code 143 to ensure that a previous security evaluation 157 has been performed. The security verification client service 169 may also include repair functionality to attempt to repair any security risks detected for the dynamically loaded code 143. In some examples, at least a portion of the security verification client service 169 may be implemented by network devices in the network 119, e.g., firewalls, load balancers, routers, and/or other devices.

The client device 100 may be configured to execute applications beyond the marketplace client application 166, the sandboxed environment 129, the application instances 134, and the security verification client service 169, such as, for example, browsers, mobile applications, email applications, social networking applications, and/or other applications.

Next, a general description of the operation of the various components of the networked environment 110 is provided. To begin, developers or other users provide applications 131 to the application marketplace system 125. The application marketplace system 125 may determine the type of application 131 that is submitted for consideration. Where the applications 131 are native or monolithic, the security verification service 128 may perform a security evaluation on the applications 131, and in response to detected security risks, may reject, repair, flag, etc., applications 131 that include detected security risks.

Where the applications 131 are dynamic applications, the security verification service 128 may take various approaches to security evaluation. In a first set of approaches, an application 131 is executed within the sandboxed environment 129 as an application instance 134, and the security verification service 128 monitors whether the application instance 134 requests or attempts to access dynamically loaded code 143 from an external network site 147. When the application instance 134 requests or attempts to access the dynamically loaded code 143, the security verification service 128 may analyze the dynamically loaded code 143 for security risks.

If possible, the security verification service 128 may attempt to modify or repair issues that correspond to detected security risks. Further, the security verification service 128 may modify, flag, or suspend the offering 163 of the application 131 in the application marketplace system 125 in response to detecting a security risk. The security verification service 128 may store checksums, signatures, fingerprints, profiles, etc., of the dynamically loaded code 143 in the dynamically loaded code data 153 to allow for its identification in the future. Additionally, the security verification service 128 may store the result of the security evaluation in the previous security evaluations 157.

In a second set of approaches, the dynamic application 131 may be downloaded to and installed in the client device 100. The application 131 may be executed as an application instance 134 separately or within a sandboxed environment 129 of the client device 100. When the application instance 134 requests or attempts to access the dynamically loaded code 143, the security verification client service 169 may analyze the dynamically loaded code 143 for security risks. The security verification client service 169 may report the results of the security evaluation to the security verification service 128.

Performing a security evaluation in the client device 100 may be relatively expensive in terms of processor usage, memory usage, and/or battery consumption. In some embodiments, in lieu of a security evaluation performed in the client device 100, the security verification client service 169 may transmit the dynamically loaded code 143, or a uniform resource locator (URL) corresponding to a source of the dynamically loaded code 143, to the security verification service 128 for evaluation within the computing environment 113. Alternatively, the security verification client service 169 may determine a checksum, fingerprint, signature, or other version identifier of the dynamically loaded code 143, and then query the security verification service 128 to determine the results of a previous security evaluation 157, if available. In one embodiment, certificate pinning may be utilized to verify the signatures of data obtained from the external network site 147. If a previous security evaluation 157 is not available, the security verification service 128 and/or the security verification client service 169 may perform a security evaluation on the newly obtained dynamically loaded code 143, and the results may then be stored as a previous security evaluation 157.

The security verification client service 169 may be configured to perform repair functionality to address security issues discovered by the security verification client service 169 and/or the security verification service 128. The security verification client service 169 may repair, replace, or delete the offending dynamically loaded code 143 so as to eliminate security risks. This may result in breaking the operation of the application instance 134, but it may be more desirable for the application instance 134 to be broken than to continue with the detected security risk. In some cases, the security verification client service 169 may choose to terminate the application instance 134. When security risks are detected and/or eliminated, the user at the client device 100 may be informed of the results.

As a non-limiting example of detection and elimination of a security risk, the security verification client service 169 may detect that the application instance 134 seeks to transmit data to "www.malicioususers.site," corresponding to a site known to be associated with malicious users. In order to repair the application instance 134, the security verification client service 169 may change the domain name resolution for the application instance 134 to be "NXDOMAIN," thereby preventing resolution of the domain name to the actual network address of the malicious site. Alternatively, firewall rules for the client device 100 may be configured to block communication to the network host associated with the domain name. Blocking communication to the offending network host may or may not affect the end user functionality for the application instance 134, but the security risk is neutralized.

Determining whether the application instance 134 seeks to access dynamically loaded code 143 may be done in several ways. For example, the application marketplace system 125 may require that applications 131 that obtain remote data use certain application programming interface (API) calls as a condition of being offered by the application marketplace system 125. To enforce this condition, the security verification service 128 may detect whether the application 131 is configured to contact external network sites 147 without using the particular API calls, and if so, refusing consideration of the application 131. The API calls may distinguish obtaining mere data from obtaining data that includes dynamically loaded code 143. When an application instance 134 at runtime makes an API call for code, the security verification client service 169 and/or the security verification service 128 may then be configured to perform a security evaluation on the dynamically loaded code 143 that is obtained.

Additionally, the security verification service 128 and/or the security verification client service 169 may be configured to detect when data is loaded into executable code memory 137 as opposed to data memory 140. For example, the security verification service 128 and/or the security verification client service 169 may trace and label data downloaded by the application 131 via the network 119 through the use of the sandboxed environment 129. Data that is loaded into data memory 140 may be restricted to non-executable, while data that is loaded into executable code memory 137 may be executed. The detection may occur via the use of the sandboxed environment 129, which may be configured to track into which areas of memory downloaded data is loaded. In response to data being loaded into executable code memory 137 by the application instance 134, the security verification service 128 and/or the security verification client service 169 may perform a security evaluation on the data. In one embodiment, the application 131 may be restricted by the sandboxed environment 129 from loading executable code into memory except by way of a particular API call.

In some cases, code may be detected via an analysis of the downloaded data. However, most techniques are architecture specific. For example, specific analyses may be performed to detect x86 code, ARM code, hypertext markup language (HTML) 5 code, and so on.

In another embodiment, the sandboxed environment 129 of the client device 100 may be configured to route all external data requests, or external data requests identified as requests for dynamically loaded code 143, made by the application instances 134 via a proxy service provided by the security verification service 128. Thus, the security evaluation may be performed by the security verification service 128 on the server-side, in the computing environment 113, rather than in the client device 100. Proxying the data requests may have various advantages, including caching of the dynamically loaded code 143 in the dynamically loaded code data 153 and potential download speed improvements.

The results of the security evaluation may dictate an action that is initiated by the security verification service 128 and/or the security verification client service 169. In some cases, the severity of the detected security risks may vary. For low-level risks, the application marketplace system 125 may simply flag the offering 163 of the application 131 rather than removing it entirely. In some cases, a privilege level for the application 131 may be specified based upon the level of security evaluation performed on the application 131 and/or the level of security risks detected in the application 131. The privilege level may configure what privileges are afforded to the application instance 134 in the client device 100.

In some cases, the proprietor of the application marketplace system 125 may elect to whitelist certain applications 131 or vendors of applications 131 such that security evaluations are avoided. Such applications 131 or vendors thereof may be trusted by the proprietor such that additional security evaluations under the auspices of the application marketplace system 125 are regarded as unnecessary. Such applications 131 may be signed with a certificate, and the signature may be verified to determine the source.

Figure 3:
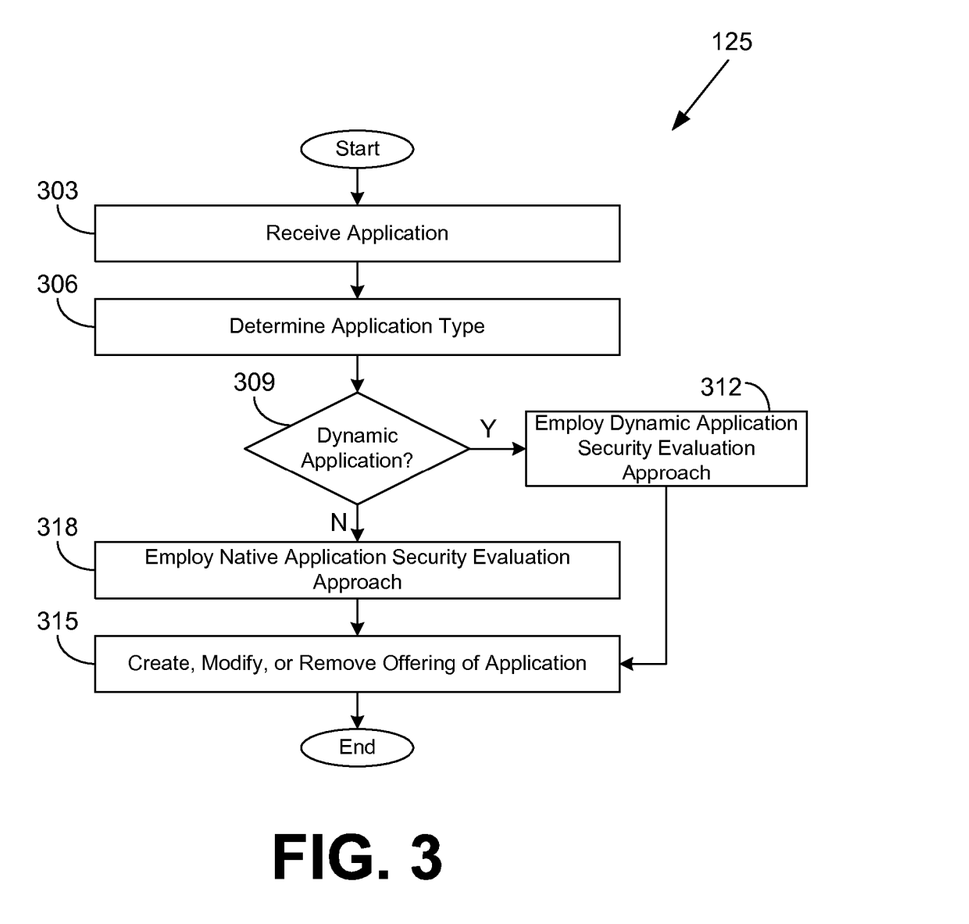
FIG. 3 is a flowchart illustrating one example of functionality implemented as portions of an application marketplace system executed in a computing environment in the networked environment of FIG. 2 according to various embodiments of the present disclosure.

Referring next to FIG. 3, shown is a flowchart that provides one example of the operation of a portion of the application marketplace system 125 according to various embodiments. It is understood that the flowchart of FIG. 3 provides merely an example of the many different types of functional arrangements that may be employed to implement the operation of the portion of the application marketplace system 125 as described herein. As an alternative, the flowchart of FIG. 3 may be viewed as depicting an example of steps of a method implemented in the computing environment 113 (FIG. 2) according to one or more embodiments.

Beginning with box 303, the application marketplace system 125 receives an application 131 (FIG. 2). The application 131 may be uploaded by a developer or other user. Alternatively, the application 131 may be downloaded to the data store 122 (FIG. 2) by the proprietor of the application marketplace system 125. In box 306, the application marketplace system 125 determines the type of the application 131, whether the application 131 is a native/standalone application 131 or a dynamic application 131. For example, the application marketplace system 125 may employ the security verification service 128 (FIG. 2) to determine whether the application 131 makes API calls associated with downloading dynamically loaded code 143 (FIG. 2).

In box 309, the application marketplace system 125 determines whether the application 131 is a dynamic application 131. A dynamic application 131 may be self-declared as such by a developer, or an application 131 may be determined to be dynamic by reports of application runtime behavior from client devices 100, by API analysis, by running the application in a sandboxed environment 129 (FIG. 2), or by another approach. If the application 131 is a dynamic application 131, the application marketplace system 125 continues to box 312 and employs a dynamic application security evaluation approach.

This approach may involve continued verification procedures after the application 131 is accepted into the application marketplace system 125 as its behavior may change with code updates. It is understood that a dynamic application security evaluation approach may also include the security evaluations performed under the native application security evaluation approach, as dynamic applications 131 typically include some native code, such as a container, that may be evaluated for security risks. Thereafter, the application marketplace system 125 continues to box 315. If the application 131 is not a dynamic application 131, the application marketplace system 125 continues from box 309 to box 318 and employs a native application security evaluation approach. The application marketplace system 125 then continues to box 315.

In box 315, the application marketplace system 125 creates, modifies, or removes an offering 163 (FIG. 2) of the application based at least in part on the security evaluation results. For example, an application 131 verified to have no security risks may be added to the application marketplace. Alternatively, an application 131 that is determined to include security risks may be modified to remove the security risks, if possible, or may be removed from the application marketplace entirely. In some cases, an offering 163 may be associated with a flag indicating potential security problems. In one embodiment, an offering 163 may be flagged to indicate that it is a dynamic application 131 subject to further verification procedures. Such flags may include textual warnings, icons, and/or other indicia. The offering 163 may indicate a privilege level granted to the application 131 based at least in part on a level of security verification that has been performed. Thereafter, the portion of the application marketplace system 125 ends.

Figure 4:
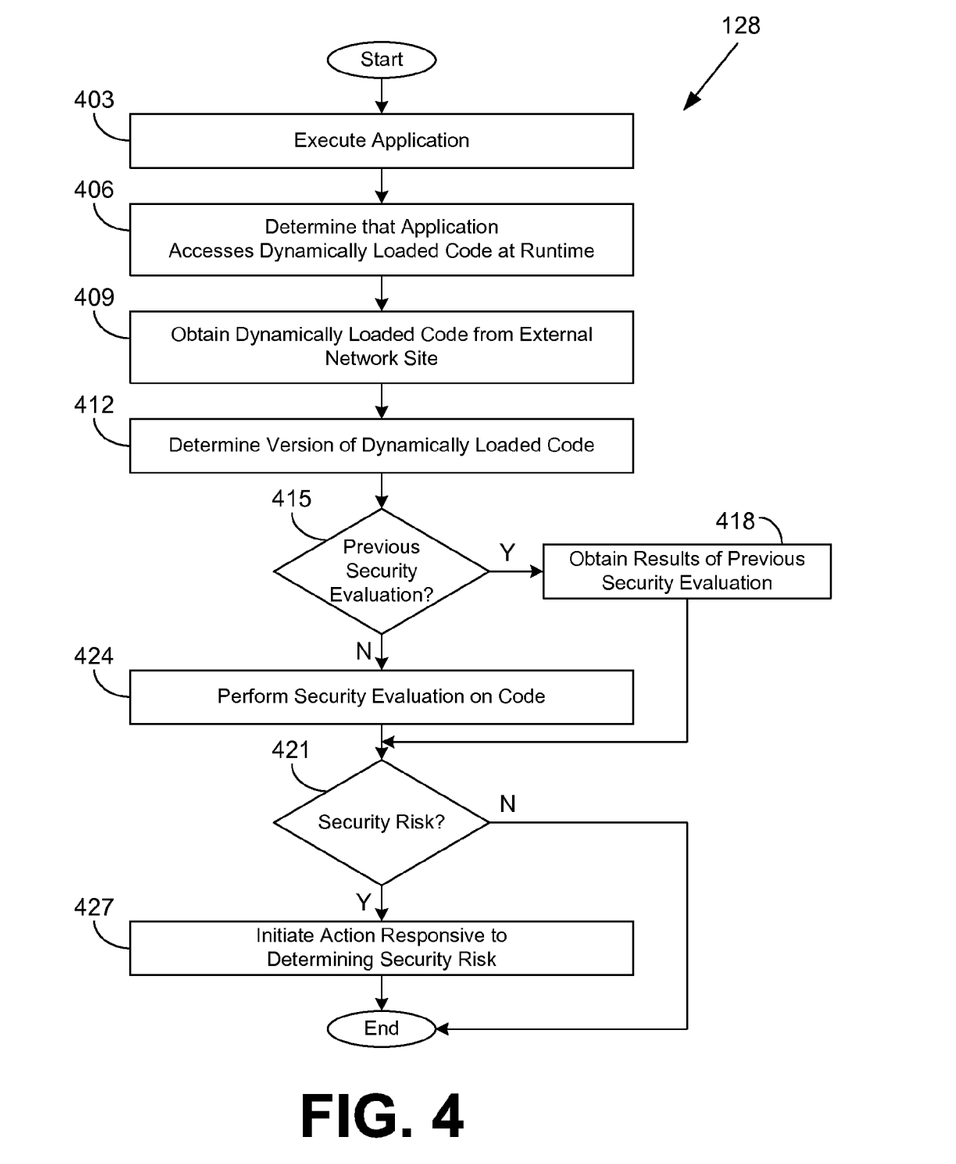
FIG. 4 is a flowchart illustrating one example of functionality implemented as portions of a security verification service executed in a computing environment in the networked environment of FIG. 2 according to various embodiments of the present disclosure.

Moving on to FIG. 4, shown is a flowchart that provides one example of the operation of a portion of the security verification service 128 according to various embodiments. It is understood that the flowchart of FIG. 4 provides merely an example of the many different types of functional arrangements that may be employed to implement the operation of the portion of the security verification service 128 as described herein. As an alternative, the flowchart of FIG. 4 may be viewed as depicting an example of steps of a method implemented in the computing environment 113 (FIG. 2) according to one or more embodiments. Some or all of the tasks shown in FIG. 4 may instead or additionally be performed by the security verification client service 169 (FIG. 2) in the client device 100 (FIG. 1).

Beginning with box 403, the security verification service 128 executes an application 131 (FIG. 2) as an application instance 134 (FIG. 2). In box 406, the security verification service 128 determines that the application 131 accesses dynamically loaded code 143 (FIG. 2) at runtime. For example, the application 131 may make an API call corresponding to dynamic code use, the application 131 may load downloaded data to executable code memory 137, the application 131 may download data that includes recognizable executable code, and so on.

In box 409, the security verification service 128 obtains dynamically loaded code 143 that is requested from an external network site 147 (FIG. 2). In one embodiment, the security verification service 128 may proxy a request for the dynamically loaded code 143 on behalf of the client device 100. In another embodiment, the security verification service 128 may initiate its own request for the dynamically loaded code 143 from the external network site 147. In yet another embodiment, the security verification client service 169 may actually obtain the dynamically loaded code 143 from the external network site 147 but then transmit a version identifier to the security verification service 128.

In box 412, the security verification service 128 determines a version of the dynamically loaded code 143. For example, the security verification service 128 may determine a fingerprint, code signature, checksum, etc., associated with the dynamically loaded code 143. In box 415, the security verification service 128 determines whether a previous security evaluation 157 (FIG. 2) exists for the version of the dynamically loaded code 143. For example, the security verification service 128 may compare a fingerprint of the dynamically loaded code 143 to a library of fingerprints in the dynamically loaded code data 153 (FIG. 2) associated with previously analyzed code. If a previous security evaluation 157 exists, the security verification service 128 moves from box 415 to box 418 and obtains the results of the previous security evaluation 157 from the data store 122 (FIG. 2). The security verification service 128 then continues to box 421. If no previous security evaluation 157 for the particular version exists, the security verification service 128 moves instead from box 415 to box 424 and performs a security evaluation on the dynamically loaded code 143. In some embodiments, the security verification service 128 may receive the results of a security evaluation from the client device 100. The security verification service 128 continues to box 421.

In box 421, the security verification service 128 determines whether a security risk is detected for the version of the dynamically loaded code 143. If no security risk is detected, the application 131 is verified and may continue executing. Thereafter, the security verification service 128 ends. If a security risk is detected, the security verification service 128 proceeds from box 421 to box 427 and initiates one or more actions in response to the security risk. The results of the security evaluation may be communicated to an entity associated with the application marketplace. For example, the security verification service 128 may modify, flag, or remove an offering 163 (FIG. 2) of the application 131 in the application marketplace.

The security verification service 128 may repair or modify the application 131 to eliminate the security risk. The security verification service 128 may cause the client device 100 to terminate execution of the application 131 and/or uninstall the application 131. In some cases, the security verification service 128 may alter the configuration of the sandboxed environment 129 to eliminate the security risk. For example, network filtering rules may be updated to block traffic to a malware network site in the sandboxed environment 129, or the contacts accessible to the application 131 via the sandboxed environment 129 may be replaced with dummy contacts. Thereafter, the portion of the security verification service 128 ends.

Figure 5:
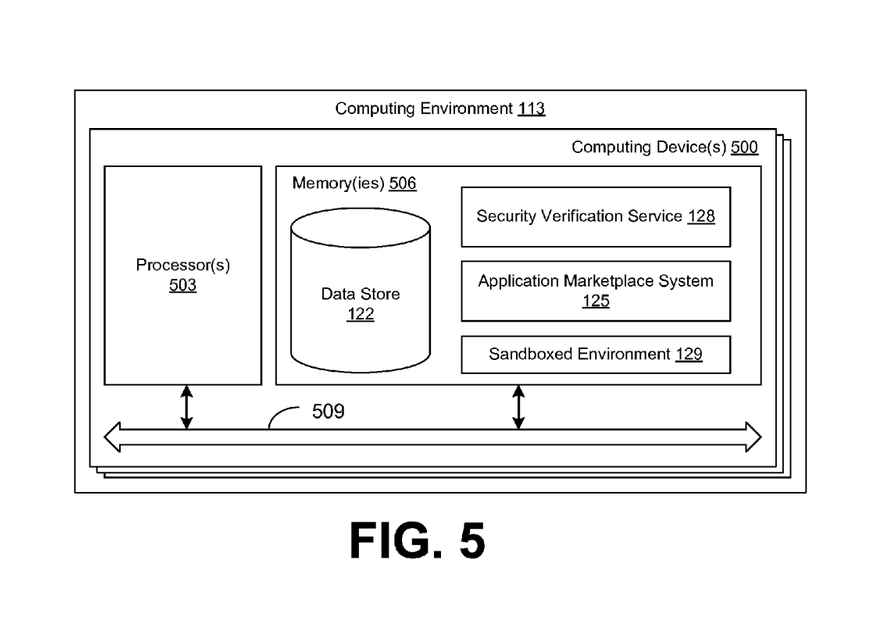
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 113 according to an embodiment of the present disclosure. The computing environment 113 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the security verification service 128, the application marketplace system 125, the sandboxed environment 129, and potentially other applications. Also stored in the memory 506 may be a data store 122 and other data.

In addition, an operating system may be stored in the memory 506 and executable by the processor 503.

Figure 6:
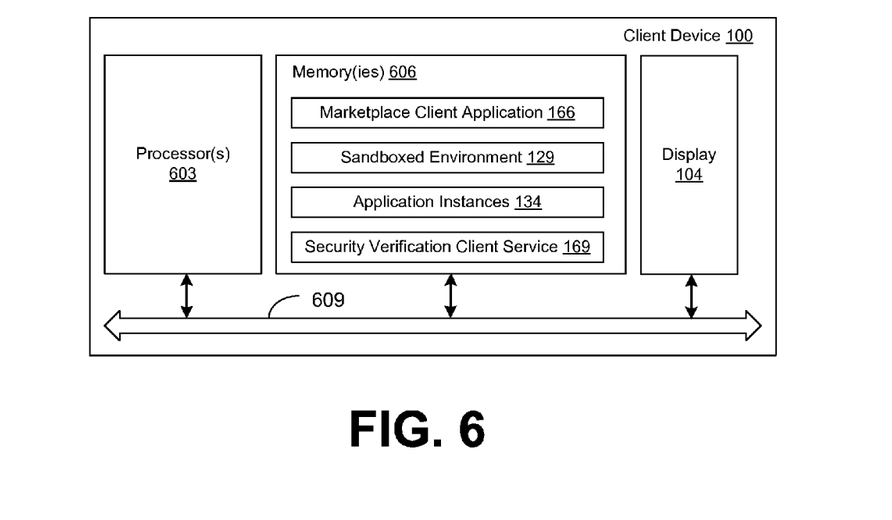
FIG. 6 is a schematic block diagram that provides one example illustration of a client device employed in the networked environment of FIG. 2 according to various embodiments of the present disclosure.

With reference to FIG. 6, shown is a schematic block diagram of the client device 100 according to an embodiment of the present disclosure. The client device 100 includes at least one processor circuit, for example, having a processor 603 and a memory 606, both of which are coupled to a local interface 609. The local interface 609 may comprise, for example, a data bus with an accompanying address/control bus or other bus structure as can be appreciated. A display 104 may also be coupled to the local interface 609.

Stored in the memory 606 are both data and several components that are executable by the processor 603. In particular, stored in the memory 606 and executable by the processor 603 are the marketplace client application 166, the sandboxed environment 129, the application instances 134, the security verification client service 169, and potentially other applications. Also stored in the memory 606 may be a data store and other data. In addition, an operating system may be stored in the memory 606 and executable by the processor 603.

Referring now to both FIGS. 5 and 6, it is understood that there may be other applications that are stored in the memories 506, 606 and are executable by the respective processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 506, 606 and are executable by the respective processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may each represent multiple processors 503, 603 and/or multiple processor cores and the memories 506, 606 may each represent multiple memories 506, 606 that operate in parallel processing circuits, respectively. In such a case, the local interfaces 509, 609 may be appropriate networks that facilitate communication between any two of the multiple processors 503, 603, between any processor 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the security verification service 128, the application marketplace system 125, the sandboxed environment 129, the marketplace client application 166, the application instances 134, the security verification client service 169, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the application marketplace system 125 and the security verification service 128. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 3 and 4 depict a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the security verification service 128, the application marketplace system 125, the sandboxed environment 129, the marketplace client application 166, the application instances 134, and the security verification client service 169, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
  execute an instance of an application in a sandboxed environment, the application being received from an application marketplace;
  determine during runtime of the instance of the application that the instance of the application is attempting to access dynamically loaded code based at least in part on a determination that the instance of the application is making a particular application programming interface (API) call to obtain executable code from a network site, wherein the instance of the application is restricted from obtaining the executable code except by way of the particular API call;

perform a security evaluation on the dynamically loaded code in response to determining that the instance of the application is attempting to access the dynamically loaded code, the security evaluation being based at least in part on at least one of: a version of the dynamically loaded code, a source associated with the dynamically loaded code, or whether the dynamically loaded code is configured to communicate with an untrusted server;

communicate a result of the security evaluation to an entity device associated with the application marketplace; and modify a portion of the dynamically loaded code to eliminate a security risk detected by the security evaluation, a remaining portion of the dynamically loaded code remaining unmodified.

2. The non-transitory computer-readable medium of claim 1, wherein the at least one computing device corresponds to a client device.

3. The non-transitory computer-readable medium of claim 1, wherein performing the security evaluation further comprises receiving a result of a previous security evaluation on the dynamically loaded code from the application marketplace.

4. The non-transitory computer-readable medium of claim 1, wherein modifying the portion of the dynamically loaded code further comprises at least one of repairing the portion of the dynamically loaded code to eliminate the security risk or replacing the portion of the dynamically loaded code with an acceptable portion of code to eliminate the security risk.

5. A system, comprising:
at least one computing device; and
a security verification service executable in the at least one computing device, wherein, when executed, the security verification service causes the at least one computing device to at least:
execute an instance of an application, the application being offered in an application marketplace;
determine during runtime of the instance of the application that the instance of the application is attempting to access dynamically loaded code from a network site;
perform a security evaluation on the dynamically loaded code in response to determining that the instance of the application is attempting to access the dynamically loaded code, the security evaluation being based at least in part on at least one of: a version of the dynamically loaded code, a source associated with the dynamically loaded code, or whether the dynamically loaded code is configured to communicate with an untrusted server;
communicate a result of the security evaluation to the application marketplace; and
modify a portion of the dynamically loaded code accessed by instance of the application to eliminate a security risk identified by the security evaluation, a remaining portion of the dynamically loaded code remaining unmodified.

6. The system of claim 5, wherein determining during runtime of the instance of the application that the instance of the application is attempting to access the dynamically loaded code from the network site further comprises determining that the instance of the application is making a particular application programming interface (API) call, wherein the instance of the application is restricted from obtaining the dynamically loaded code except by way of the particular API call.

7. The system of claim 5, wherein determining during runtime of the instance of the application that the instance of the application is attempting to access the dynamically loaded code from the network site further comprises:
tracing data downloaded by the instance of the application from the network site; and
determining that the data comprises executable code.

8. The system of claim 5, wherein performing the security evaluation further comprises:
determining that a previous security evaluation has been performed on the dynamically loaded code; and
utilizing the previous security evaluation as the security evaluation when the previous security evaluation has been performed.

9. The system of claim 8, wherein determining whether the previous security evaluation has been performed further comprises:
determining a fingerprint of the dynamically loaded code; and
comparing the fingerprint to a fingerprint library associated with a plurality of previous security evaluations of dynamically loaded code.

10. The system of claim 5, wherein the security verification service further causes the at least one computing device to at least: in response to a security risk identified by the security evaluation, terminate the instance of the application or prevent loading of the dynamically loaded code by the instance of the application.

11. The system of claim 5, wherein the security verification service further causes the at least one computing device to at least permit the instance of the application to execute the dynamically loaded code when no security risk is identified by the security evaluation.

12. The system of claim 5, wherein the security verification service further causes the at least one computing device to at least disable or flag an offering of the application in the application marketplace.

13. The system of claim 5, wherein the instance of the application is executed in a mobile device.

14. The system of claim 5, wherein the instance of the application is executed in a server environment being operated on behalf of the application marketplace.

15. The system of claim 5, wherein modifying the portion of the dynamically loaded code further comprises repairing the dynamically loaded code to eliminate the security risk.

16. A method, comprising:
executing, via at least one of one or more computing devices, an instance of an application in a sandboxed environment, the application being received from a provider of the application;
determining, via at least one of the one or more computing devices, that the instance of the application has downloaded data from a network site;
determining, via at least one of the one or more computing devices, that the downloaded data comprises executable code in response to at least one of:
determining that the instance of the application has loaded at least a portion of the downloaded data into an executable area of memory in the sandboxed environment; or
determining that the instance of the application has made a particular application programming interface (API) call to obtain the downloaded data, wherein the instance of the application is restricted from obtaining the executable code except by way of the particular API call;

performing, via at least one of the one or more computing devices, a security evaluation on the at least a portion of the downloaded data, the security evaluation being based at least in part on a version of the downloaded data, a source associated with the downloaded data, or whether the executable code is configured to communicate with an untrusted server;

communicating, via at least one of the one or more computing devices, a result of the security evaluation to the provider of the application; and modifying, via at least one of the one or more computing devices, a portion of the executable code of the downloaded data to eliminate a security risk identified by the security evaluation, a remaining portion of the executable code remaining unmodified.

17. The method of claim 16, further comprising:

determining, via at least one of the one or more computing devices, a code signature associated with the at least a portion of the downloaded data; and receiving, via at least one of the one or more computing devices, a result for a prior security evaluation corresponding to the code signature.

18. The method of claim 16, wherein the provider of the application is an application marketplace, and the application marketplace and the network site are controlled by different entities.

19. The method of claim 16, wherein the instance of the application is executed in the sandboxed environment in response to a dynamic application indication that is received from the provider of the application and is associated with the application.

20. The method of claim 16, wherein modifying a portion of the executable code further comprises replacing the portion of the executable code with an acceptable portion of code to eliminate the security risk.

* * * * *